(12) United States Patent
Liberkowski

(10) Patent No.: US 12,025,272 B2
(45) Date of Patent: Jul. 2, 2024

(54) METHOD AND SYSTEM FOR CONTAINING A SMALL ATOMIC STRUCTURE GAS

(71) Applicant: Janusz B. Liberkowski, Los Gatos, CA (US)

(72) Inventor: Janusz B. Liberkowski, Los Gatos, CA (US)

(73) Assignee: VSENS INC., Palo Alto, CA (US)

( * ) Notice: Subject to any disclaimer, the term of this patent is extended or adjusted under 35 U.S.C. 154(b) by 149 days.

(21) Appl. No.: 17/776,907

(22) PCT Filed: Dec. 1, 2019

(86) PCT No.: PCT/US2019/063902
§ 371 (c)(1),
(2) Date: May 13, 2022

(87) PCT Pub. No.: WO2021/096541
PCT Pub. Date: May 20, 2021

(65) Prior Publication Data
US 2022/0403979 A1  Dec. 22, 2022

Related U.S. Application Data

(60) Provisional application No. 62/974,129, filed on Nov. 14, 2019.

(51) Int. Cl.
*F17C 1/08* (2006.01)
*F17C 1/12* (2006.01)

(52) U.S. Cl.
CPC ............ *F17C 1/12* (2013.01); *F17C 1/08* (2013.01); *F17C 2201/0109* (2013.01); *F17C 2201/018* (2013.01); *F17C 2203/012* (2013.01); *F17C 2203/037* (2013.01); *F17C 2203/0379* (2013.01); *F17C 2203/0629* (2013.01); *F17C 2221/012* (2013.01); *F17C 2260/036* (2013.01)

(58) Field of Classification Search
CPC .............. F17C 1/08; F17C 2201/0109; F17C 2221/012; F17C 2203/0629; F17C 2203/0379; F17C 2203/037; F17C 2203/012; F17C 2201/018
USPC ........................................................ 220/585
See application file for complete search history.

(56) References Cited

U.S. PATENT DOCUMENTS

| | | | | |
|---|---|---|---|---|
| 2,991,900 A | * | 7/1961 | Poorman | F17C 3/08 220/560.04 |
| 4,871,087 A | * | 10/1989 | Johnson | B67D 7/0261 222/146.2 |
| 7,886,940 B2 | * | 2/2011 | Lavan | F17C 1/00 220/585 |
| 8,701,926 B2 | * | 4/2014 | Childress | B60K 15/03 220/585 |
| 2015/0064585 A1 | * | 3/2015 | Hyde | F02M 21/0221 123/3 |

* cited by examiner

*Primary Examiner* — Stephen J Castellano
(74) *Attorney, Agent, or Firm* — Jurgen Vollrath

(57) ABSTRACT

In a hydrogen or helium container and method for containing the gas, a double-walled housing is provided, which defines an inter-space between the inner and the outer walls, the inter-space being filled with a fluid at a higher pressure than the pressure of the hydrogen or helium contained within the inner wall.

12 Claims, 3 Drawing Sheets

PROPOSED HYDROGEN STORAGE TECHNOLOGY
$p_1$ = pressure outside inner wall
$p_0$ = hydrogen pressure inside
Double-walled housing
Atmospheric pressure outside

METHOD AND SYSTEM FOR CONTAINING A SMALL ATOMIC STRUCTURE GAS

FIELD OF THE INVENTION

The invention relates to containment of gases made of small molecules or atoms, such as hydrogen or helium. In particular it relates to a method and containers for limiting the loss of the gas through the walls of the container.

BACKGROUND OF THE INVENTION

One of the main problems with hydrogen and helium storage is the minute size of the hydrogen molecule and the helium atom.

Since, at room temperature, under atmospheric pressure, hydrogen is a gas with a molecule comprising only two hydrogen atoms each with a single proton, hydrogen is highly permeable and has the tendency of escaping from the containers or tanks they are stored in. The same applies to helium which is made up of atoms, each with two protons.

Traditionally, hydrogen barrier coatings or liners are used to limit the escape of hydrogen. The liners may comprise aluminum and copper alloys, or polymers like cross-linked polyethylene covered with a graphite fiber epoxy layer.

In order to enhance the containment of hydrogen, these liners need to have a coefficient of thermal expansion similar to that of the tank material (to prevent cracking), and low cost and weight.

Hydrogen storage tanks with their low permeability lining typically display high tensile strength, no reactivity with hydrogen and low diffusivity.

Another prior art hydrogen storage method is through the use of hydride based hydrogen storage technology. This method is still in a research stage but can be considered as a solid state hydrogen storage. In this approach the need for liner materials is avoided. Currently different hydrides are being investigated as possible hydrogen storage candidates. These are classified mainly into two groups as metal hydrides and chemical hydrides.

However, it would be beneficial to be able to store hydrogen in its natural state without having to first resort to capturing the hydrogen in the form of a hydride. It would also be beneficial to be able to better contain helium. Airships and blimps, for example, are commonly held aloft by means of helium gas, which tends to escape through the wall of the bag or bladder that defines the helium container.

SUMMARY OF THE INVENTION

The present application provides a totally novel storage system for small atomic structure gases such as hydrogen and helium, which will virtually eliminate loss of the hydrogen or helium by diffusion.

For ease of reference all small atomic structure gases that tend to escape through the walls of their containers will be referred to herein as hydrogen but it will be understood that other small atomic structure gases such as helium are included and that the small atomic structure gas may be maintained in liquid or solid form depending on the temperature and the pressure.

According to the invention there is provided a container for small atomic structure gases such as hydrogen or helium comprising a double-walled housing with an inner wall and an outer wall, defining an inter-space between the inner and outer walls, wherein a fluid, other than small atomic structure gas, is maintained in the inter-space at a higher pressure than the pressure of hydrogen contained within the inner wall of the container. The term "fluid" is used in its conventional sense as including gases and liquids. It will be appreciated that the container can be configured in different shapes. For example, the container may comprise a cylinder with a circular or oval cross-section.

Insofar as the container has a multi-faceted or multi-part inner wall or multi-faceted outer wall these walls could be thought of as comprising multiple walls or wall sections, however, for ease of description the singular term "wall" will be used in this application to define any wall configuration. It will also be appreciated that the inner and outer walls need not have the same configuration. Also, in order to space the inner wall from the outer wall on all sides, spacers may be provided to keep the inner wall spaced from the outer wall. The spacers may, for example, take the form of ribs or rods extending between the inner and outer walls.

The inner wall may be made of any suitable material that won't react chemically with hydrogen or with the fluid in the inter-space, and can withstand the pressure differential between that of the hydrogen housed within the inner wall, and the fluid in the inter-space. The outer wall may be made of any suitable material that won't react chemically with the fluid in the inter-space and can withstand the pressures of the fluid in the inter-space. Insofar as the inner wall is made of a flexible material, the outer wall will have to be capable of withstanding the combined pressure of both the hydrogen housed within the inner part of the housing defined by the inner wall, and the fluid in the inter-space. For instance, the inner and outer walls may be made of stainless steel. The inner and outer walls may be made of the same material or of different materials.

The fluid in the inter-space may be a gas or a liquid. The gas may be an inert gas. For example, the gas in the inter-space may be nitrogen. In the case of a liquid, it may be liquid water.

Further, according to the invention, there is provided a method of containing hydrogen, comprising providing an inner housing spaced from a surrounding outer housing, maintaining a fluid other than hydrogen in the space between the inner housing and the outer housing, and housing the hydrogen in the inner housing at a pressure that is lower than that of the fluid in the space. The fluid in the space may be an inert gas, e.g., nitrogen, or a liquid, e.g. water. Preferably the fluid in the space is made up of molecules large enough so that they won't diffuse through the walls of the inner or outer housings. The housings may be provided with stainless steel walls.

Thus, for purposes of this application the term "small atomic structure gas" refers to gases made up of molecules or atoms small enough to pass through the walls of conventional containers. The terms "container" and "housing" are used to refer to any structure used to contain the small atomic structure gas, whether this container takes the form of a storage tank or a resilient flexible-walled container such as a resilient bladder, bag, or balloon.

The term "resilient" refers to a parameter of a flexible-walled container that provides the flexible-walled container with sufficient resilience to compression so as to afford a backpressure against the fluid in the inter-space so that the fluid in the inter-space can be maintained at a higher pressure than the small atomic structure gas being contained within the inner wall.

The term "gas" is used to include gases even when these gases are maintained in a solid or liquid state at low enough temperatures or high enough pressures. Thus, it includes, for example, low temperature hydrogen in solid form that converts into gaseous phase by sublimation. The term "fluid" is used to cover any liquid or gas.

DETAILED DESCRIPTION OF THE INVENTION

Figure 1:
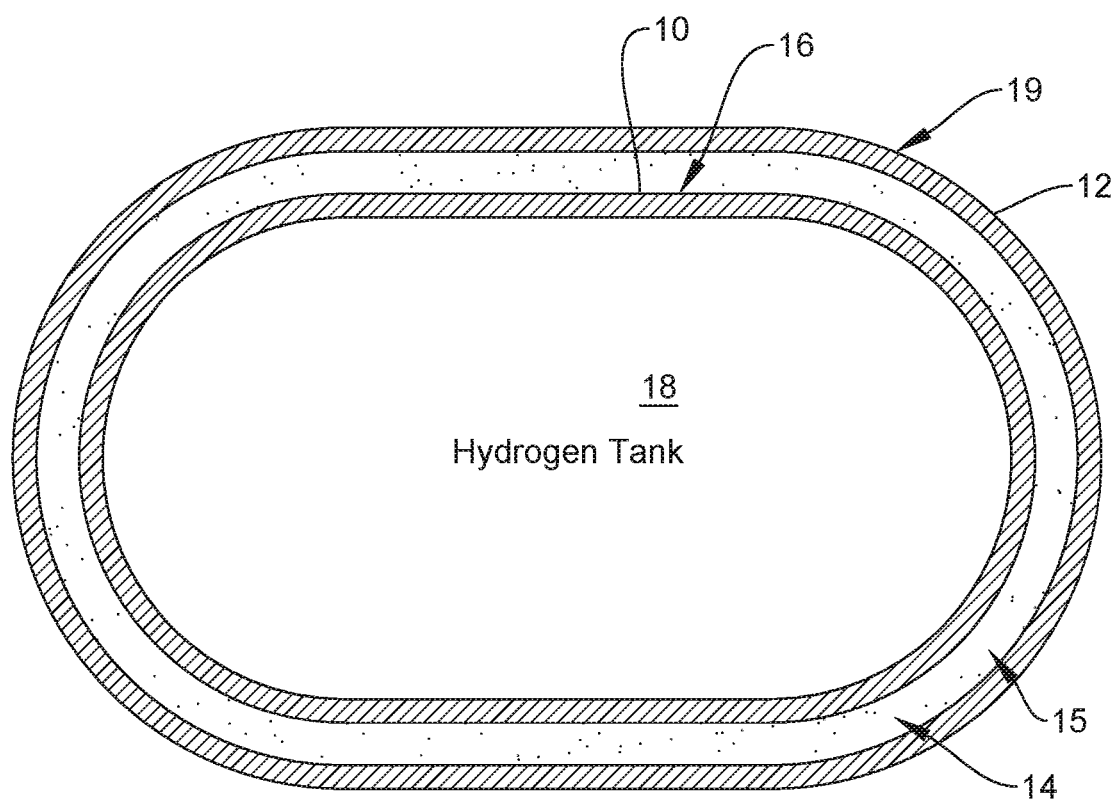
FIG. 1 is a cross-section through one embodiment of a hydrogen container of the invention.

One embodiment of a hydrogen container of the invention is shown in FIG. 1, in which an inner wall 10 is spaced from an outer wall 12 to define an inter-space 14 between the inner and outer walls.

The inner wall 10 defines an inner housing 16, which houses the hydrogen 18 in practice. For ease of illustration the filling nozzle is not shown but conventional filling ports could be incorporated to fill the inner housing with hydrogen. The outer wall 12 defines an outer housing 19. The inter-space 14 between the inner housing 16 and outer housing 19, in this embodiment, is filled with nitrogen gas 15 at a pressure in excess of that of the hydrogen 18 that will be filled into the inner housing 16. It will be appreciated that other gases or liquids can be used but preferably an inert gases is used that won't react with the material of the walls 10, 12. Also, to minimize escape of the pressurized gas 14, preferably a gas with a large enough molecular structure is chosen that will avoid or at least reduce its passing through the walls of either the inner housing 16 or outer housing 18.

In the embodiment of FIG. 1 both the inner housing 16 and outer housing 19 are cylindrical in shape with a race-track-shaped cross-section, which can be defined as substantially oval albeit that the long sides are straight. It will be appreciated that in order to avoid escape of hydrogen through the top and bottom of the container (when the container is in its operative position), the bottom or base walls of the inner and outer housings would have to be spaced apart against the force of gravity. This may be achieved by means of spacers between the inner housing 16 and outer housing 18. Insofar as the container is to be used in a weightless environment spacers on all sides may be included to avoid inertial forces displacing the inner housing 16 relative to the outer housing 19. The spacers may be made of a material that is different from that of the inner and outer walls 10, 12, but are preferably made of a material that won't chemically react with the fluid in the inter-space 14, and won't corrosively interact with one another.

Figure 2:
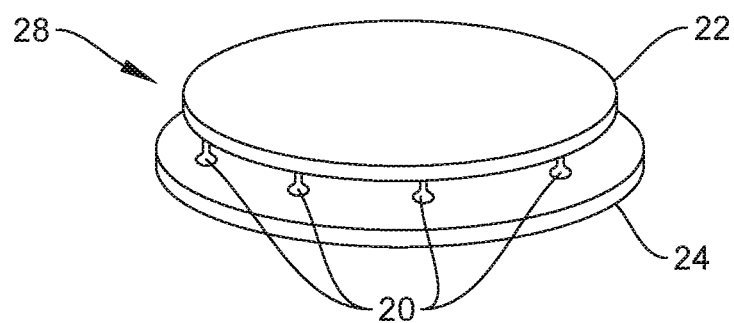
FIG. 2 is a three-dimensional view of a double-walled base of a cylindrical housing.

FIG. 2 shows one embodiment of a double-walled base that serves to close off one of the small ends of a cylindrical housing (where the container is maintained in an operatively vertical configuration). In this embodiment the double-walled base is circular and is intended for the small end of a circular cross section cylindrical housing or for a spherical container.

(It will be appreciated that the cylindrical housing of FIG. 1, with its race-track cross section, if maintained in an operatively horizontal configuration, would require a double walled base and double walled lid with a race-track shape to close the ends of the cylindrical housing of FIG. 1.)

In the embodiment shown in FIG. 2 spacers 20 in the form of rods or pins are provided between the inner base 22 of the inner housing and the outer base 24 of the outer housing. It will however be appreciated that the spacers could instead, or in addition, be provided between the vertical side walls of the inner and outer housing or between the upper lid of the inner housing and the upper lid of the outer housing, to suspend the inner housing from the outer housing.

As is shown in FIG. 2, the inner base 22 has a smaller diameter than the inner base 24 to accommodate the smaller diameter inner housing (not shown). The inter-space region 28 between the inner base 22 and the outer base 24 will be in flow communication with the inter-space between the inner and outer housings once the bases are secured to the housings. In this way the pressure of the gas in the various inter-space regions can easily be kept uniform and only one filling port (not shown) is required.

Figure 3:
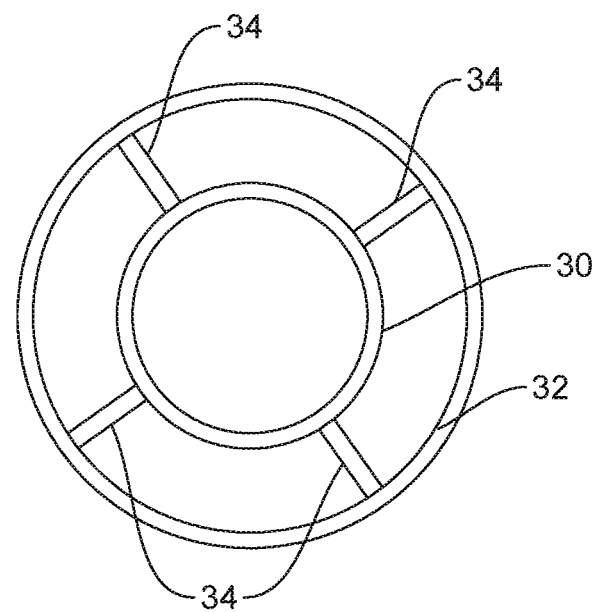
FIG. 3 shows a cross-section through another embodiment of a hydrogen container of the invention.

In another embodiment, shown in FIG. 3, the housing comprises an inner spherical housing 30 spaced from an outer spherical housing 32 by means of annular ribs 34.

Stainless steel has commonly been used in prior art pressure vessels.

In one embodiment of the present application stainless steel is used for the inner housing, however other materials can be used that can withstand the pressure differential of the hydrogen in the inner housing and the pressure of the fluid in the inter-space, and that won't chemically react with hydrogen or the fluid in the inter-space and preferably has low diffusivity to hydrogen. In the case of an inner housing with substantially rigid walls, the outer housing has to withstand the pressure of the fluid in the inter-space. The inner housing may instead comprise a resilient, flexible inner housing, in which case the resilience of the wall of the inner housing has to be large enough to oppose compression of the inner housing to a degree sufficient that the fluid in the inter-space can be maintained at a higher pressure than the pressure of the small atomic structure gas in the inner housing. Insofar as the inner wall is flexible, the outer housing will have to be capable of withstanding the combined pressure of the hydrogen gas and the resilience of the inner housing to compression. The outer housing can be made of the same material as the inner housing or of a different material, provided it does not chemically react with the fluid in the inter-space or the surroundings, e.g., atmosphere air and water vapor, that the storage container will be used in.

In one embodiment, the resilience of a flexible housing can be achieved through appropriate choice of the shape of the housing and nature of the wall material, e.g. a spherical housing with polymer plastics walls. Instead strengthening ribs can be added to the housing to resist compression.

Tensile strength presents one of the limitations to the maximum allowable pressure in the tank, and if mass is a concern, the density of the material is also important. Wall materials usually used in prior art hydrogen containers are steel alloys (Yield Strength $S_{ysingle}$=703 MPa and density ($\rho$)=7860 kg/m$^3$), titanium alloys ($S_{ysingle}$=924 MPa and $\rho$=4430 kg/m$^3$) and carbon composite ($S_{ysingle}$=2070 MPa and $\rho$=1900 kg/m$^3$), where $S_{ysingle}$ represents the resultant yield strength when reducing the totality of pressure vectors to a single vector.

The container of the present invention can be used to contain both hydrogen in a gaseous form as well as hydrogen in a liquid form. Even in liquid form, the main problem with hydrogen storage is the hydrogen boil-off, which can lead to hydrogen consumption without any usage. Boil-off refers to the phenomenon that some portion of the liquid boils under heat exchange and becomes gaseous, which can escape by permeating through the wall of a prior art housing, and is a function of thermal insulation, tank size and tank shape.

For the compressed hydrogen: currently available hydrogen storage vessels can have pressures up to 70 MPa at room temperature. Prior art hydrogen tanks are classified as Type IV tanks by federal and international standards, and require a safety factor of 2.25.

In the case of liquid hydrogen storage tanks, operational pressures typically range from 0.1 MPa to 0.35 MPa. It will, however, be appreciated that the hydrogen has to be maintained at a low enough temperature to maintain it substantially in its liquid state.

At atmospheric pressure hydrogen will assume a liquid state under 20.4 K, which is below the critical point temperature (33 K, 1.29 MPa). This temperature is in the region of cryogenic temperatures which is defined as the range below 123 K (−150 C.°).

As mentioned above, however, even in its liquid state hydrogen will still be lost due to boiling off, or sublimation of the hydrogen.

Figure 4:
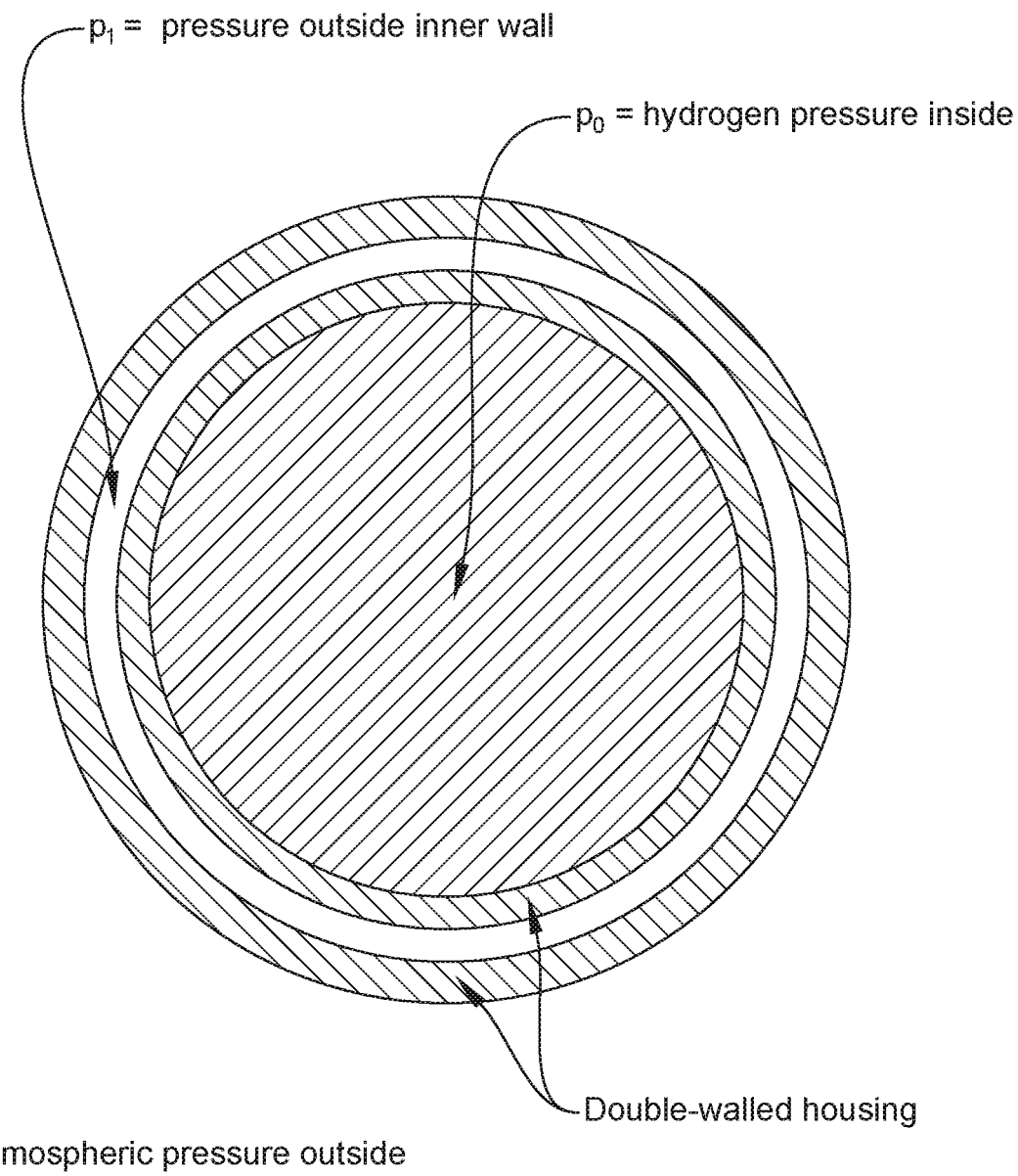
FIG. 4 is a depiction of a spherical embodiment of the invention for purposes of illustrating some of the concepts of the invention

The hydrogen leak-through rate dQ/dt through a permeable barrier can be defined as $dQ/dt=PA/t\ (p_0-p_1)$ where P is the permeability coefficient for hydrogen through the material of the barrier; A is the area defined by the barrier, t is the barrier thickness, $p_0-p_1$ is the hydrogen pressure on one side of the barrier, and $p_1$ is the pressure of the gas on the other side of the barrier. In the present invention, the inner housing wall defines the barrier, wherein the hydrogen is on one side of the barrier (inner wall) and a high pressure fluid on the other side, as illustrated in FIG. 4. By maintaining the high pressure fluid at a higher pressure than that of the hydrogen, it retards the movement of hydrogen through the wall of the inner housing. The effect of the higher pressure fluid in the inter-space of the present invention therefore provides a high pressure envelope or region around the hydrogen, thereby retarding the propagation of the hydrogen out of the inner housing since the hydrogen would not tend to move from a low pressure to a high pressure region.

This also avoids the need for costly liners and the difficulties associated with the prior art liners. Due to the simplicity of the double wall container and by avoiding the need for exotic liner materials, the container of the present invention is also expected to have a much longer life-span and greater reliability than prior art hydrogen containers.

The benefits of this invention can therefore be summed up as follows:
1. A hydrogen storage system that prevents or at least retards hydrogen permeation
2. Lower cost
3. No use of liners
4. High reliability
5. Easy interfacing with fuel cells
6. No metal or chemical hydrides
7. Low cost, easy to build, proof of concept prototype It will be appreciated that the embodiments provided herein are for illustrative purposes only. Helium could be contained in a similar manner and the nature of the container can vary, and is not limited to a storage tank. The container can, for example comprise a double walled container where one or both of the inner and outer housings are made of a flexible material with a defined resilience to compression.

What is claimed is:

1. A container for hydrogen gas comprising,
a double-walled housing with an inner wall and an outer wall, defining an inter-space between the inner and outer walls, wherein a fluid, other than small atomic structure gas, is contained in the inter-space at a higher pressure than the pressure of the hydrogen within the inner wall, in order to deter the movement of the hydrogen into the interspace.

2. A container of claim 1, wherein spacers are provided to keep the inner wall spaced from the outer wall.

3. A container of claim 2, wherein the spacers comprise ribs or rods extending between the inner and outer walls.

4. A container of claim 1, wherein the inner wall is made of a material that won't react chemically with the hydrogen gas or with the fluid in the inter-space, and can withstand the pressure differential between that of hydrogen gas housed within the inner wall, and the fluid in the inter-space.

5. A container of claim 1, wherein the outer wall is made of a material that won't react chemically with the fluid in the inter-space and can withstand the pressures of the fluid in the inter-space.

6. A container of claim 5, wherein the inner wall is made of a flexible material, and the outer wall is capable of withstanding the combined pressure of both the hydrogen gas housed within the inner wall, and the fluid in the inter-space.

7. A container of claim 5, wherein the fluid in the inter-space is an inert gas.

8. A container of claim 5, wherein the fluid in the inter-space is water.

9. A method of containing hydrogen gas, comprising
providing an inner housing spaced from a surrounding outer housing, maintaining a fluid other than the small atomic structure gas in the space between the inner housing and the outer housing, and
housing the hydrogen gas in the inner housing at a pressure that is lower than that of the fluid in the space to deter the movement of the hydrogen into the space.

10. A method of claim 9, wherein the fluid in the space is made up of molecules large enough so that they won't diffuse through the walls of the inner or outer housings.

11. A method of claim 9, wherein one or both of the inner and outer housings comprise a rigid storage tank or a resilient, flexible-walled bladder.

12. A method of claim 9, wherein the inner housing comprises a resilient, flexible-walled bladder with sufficient resilience to compression so as to afford a backpressure against the fluid in the space so that the fluid in the space can be maintained at a higher pressure than the hydrogen gas being contained within the inner housing.

* * * * *